(No Model.) 3 Sheets—Sheet 1.

P. WRIGHT.
BALING PRESS.

No. 253,468. Patented Feb. 7, 1882.

Witnesses:
J. B. Garner
W. A. Craig

Inventor:
Parvin Wright
By H. A. Ennis
Atty.

N. PETERS. Photo-Lithographer, Washington, D. C.

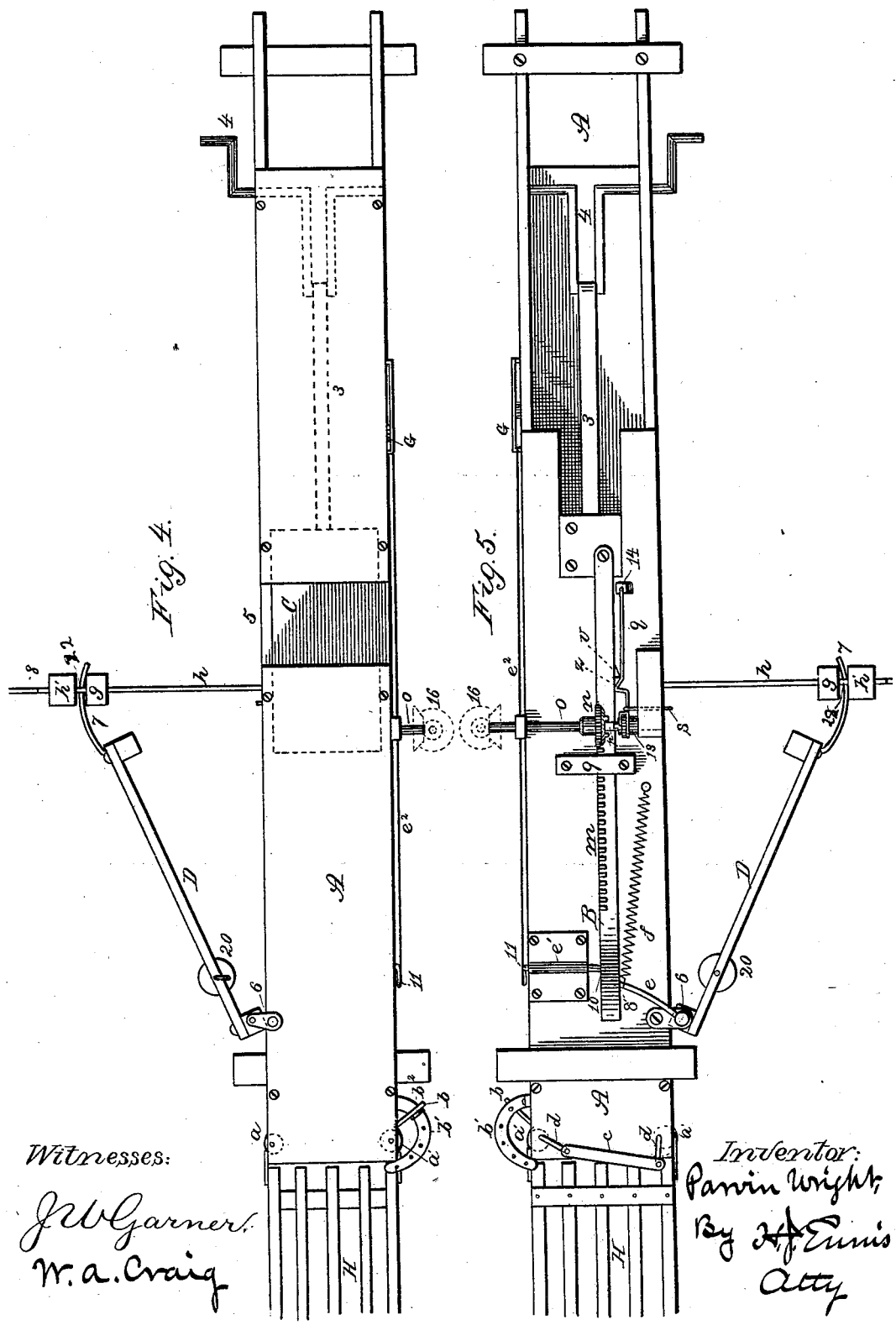

(No Model.) 3 Sheets—Sheet 3.
P. WRIGHT.
BALING PRESS.
No. 253,468. Patented Feb. 7, 1882.
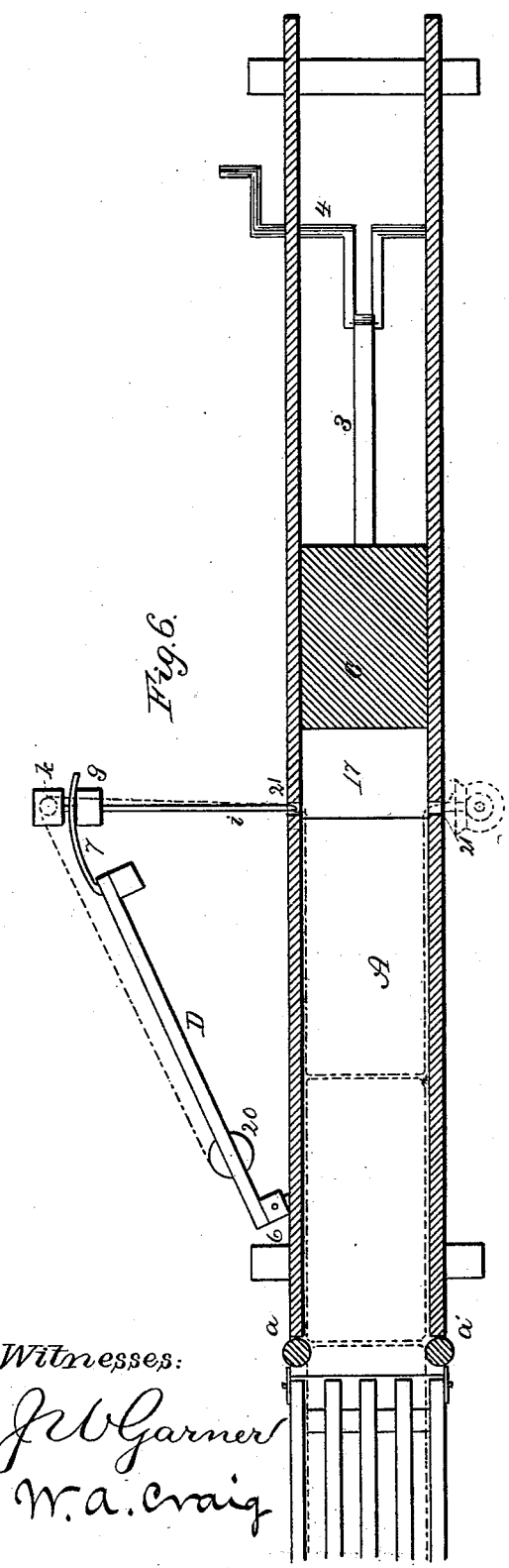
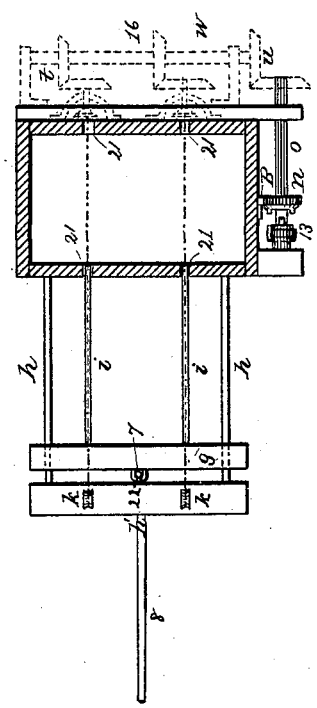
Witnesses:
J. W. Garner
W. A. Craig
Inventor:
Parvin Wright
By H. J. Ennis
Atty

UNITED STATES PATENT OFFICE.

PARVIN WRIGHT, OF HAYDEN'S STATION, COLORADO.

BALING-PRESS.

SPECIFICATION forming part of Letters Patent No. 253,468, dated February 7, 1882.

Application filed January 11, 1882. (No model.)

*To all whom it may concern:*

Be it known that I, PARVIN WRIGHT, a citizen of the United States, residing at Hayden's Station, in the county of Lake and State of Colorado, have invented certain new and useful Improvements in Baling-Presses; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention has relation to hay-presses; and the novelty consists in the construction of the same, as will be hereinafter more fully described, and particularly pointed out in the claims.

In the accompanying drawings, similar letters of reference indicate like parts of the invention.

Figure 1:
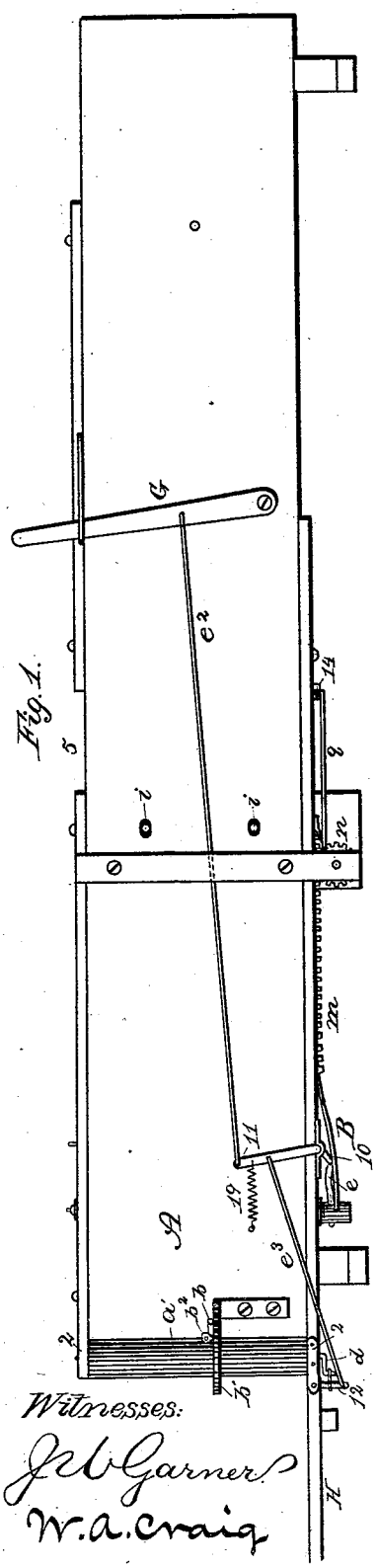
Figure 2:
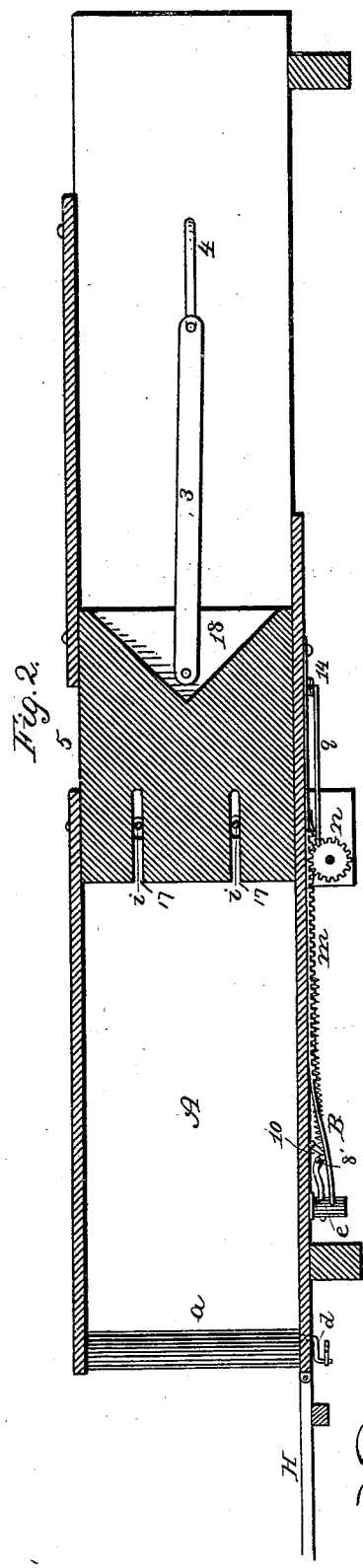
Figure 3:
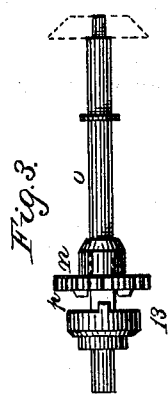

Figure 1 is a side elevation of my improved baling-press; Fig. 2, a longitudinal section; Fig. 3, a detail of the clutch for operating the twisters. Fig. 4 is a top plan view; Fig. 5, a bottom plan view; Fig. 6, a top plan view with the cover or top of the press-chamber removed, and Fig. 7 a cross-section on the line of the wire-inserters.

Heretofore in this class of presses, known in the market as "continuous" or "perpetual" baling-presses, the baling-chamber has been constructed with longitudinal slots running nearly the entire length of said chamber, whereby the tying of the bale is effected. These slots greatly weaken the press, and also require additional material in the construction of it to stand the pressure of the compressing operation. The material while being compressed is laterally forced through the slots, thus preventing an even finish to the bale. The rear ends of the presses of this class heretofore constructed have been made tapering, so as to offer a resistance to the finished bale sufficient to give a proper degree of compression to the bale in process of completion, and this has been accomplished by making the sides of the baling-chamber adjustable, so that they may be brought closer together to accomplish that object. This construction is faulty, as it prevents the proper bracing of the press at that point, and consequently an imperfectly-formed bale is the result. The tying of the bales has in this class of presses been done by hand, and this process is expensive, imperfect, and slow, as well as irregular.

To overcome all of these above-mentioned objections, I construct a press that dispenses with the longitudinal slots, and in which the resistance of the finished bale is taken from the press-chamber and provided for in a suitable and simple metallic frame attached to the rear end of the baling-chamber, thereby allowing said chamber to be constructed much lighter, cheaper, and contribute to more effectual work than can be done with the presses of this class now in use.

The means for automatically operating the wire-inserters are so arranged that every bale will be practically the same length and weight, and the insertion of the wires, as well as the tying of the same, is effected by the power applied to the follower. Consequently the employment of additional human help is dispensed with, and as long as power is applied to the follower and material fed to the press perfect and uniform bales are continuously produced by my improved press.

Referring to the drawings, A is the longitudinal baling-box, to the rear end of which is secured a light metallic frame, 2, in which are secured the shafts $a$ $a'$. These shafts are eccentrically mounted upon shafts journaled in the frame 2, and are provided with cranks $d$ $d$, connected by the rod $c$, so that by operating the lever $b$, secured to the roller $a'$, the space between said shafts may be uniformly increased or diminished at will. A segmental rack, $b'$, and pin $b^2$ (shown in Fig. 4) serve to retain the adjustment of the rollers at any desired point, so that more or less frictional resistance may be applied to the finished bale during its exit.

C is the follower or traverser, having a reciprocating motion in the forward end of the baling-chamber. This motion is imparted to it by the pitman 3 and crank 4.

The hay is fed to the machine through the opening 5, and by the operation of the traverser is forced into and compressed in the chamber A.

A frame, D, is hinged to one side of the bale-chamber at 6, and its normal position is that shown in Figs. 2, 4, 5, 6, 7, it being held in this position by the arm $e$ and spring $f$, and the free end of this frame gives a "to-and-fro" motion to the cross-head $g$, which works parallel to said frame and the side of the chamber. An arm, 7, secured to the free end of this frame, works in a guide, 22, in the cross-head $g$, which allows a parallel motion to be communicated to it, while the free end of the hinged frame travels in the arc of a circle. This cross-head $g$ is provided with two or more wire-inserters, $i\,i$, rigidly secured to it, and provided with eyes in their points for the reception of the wire.

The guides $h\,h$, secured at their outer ends by the cross-bar $h'$, and the guide-rod 8, secured to the cross head $g$, insure the proper insertion of the wire-inserters $i$ when the cross-head $g$ is operated by the frame D.

The end of the arm $e$ is bent outwardly, so as to form a pawl, 8, against which, at proper intervals, the free end of the rod B abuts or comes in contact with. This rod B is secured by its forward end to the follower C, and consequently it travels backward and forward with it, the strap or shoe 9 insuring the proper motion.

A shaft, $e'$, is secured to the bottom of the box, and one end terminates in a small crank, 10, which lies flat between the box and the free end of the bar B, and the other end is bent upward along the side of the box and terminates in an eye, 11. The normal position of this shaft $e'$ is to have the crank 10 project outwardly from the box, so that the free end of the bar B will not come in contact with the pawl 8 on the arm $e$. Therefore, when it is in this position, the free end of the rod B will ride over the crank 10 and pass over the pawl 8; but if the shaft $e'$ is operated so as to turn the crank 10 flat against the bottom of the box, then the free end of the rod B comes into contact with the pawl 8, which forces the arm $e$ along with it and causes the frame D to operate the cross-head $g$, thereby forcing the wire-inserters $i$ through the box from side to side. The follower C in its return motion brings the bar B back with it, and the spring $f$ causes the frame D and its accompanying mechanism to follow and resume its normal position. The crank 10 is then again turned outwardly, and in its subsequent movement the free end of the bar B rides over the crank 10, and consequently does not come into contact with the pawl 8, so the frame D and its mechanism is not operated.

A hand-lever, G, is connected by a rod, $e^2$, to the eye 11 of the shaft $e'$, so that said shaft and its crank 10 may be operated at pleasure by the hand-lever G. A swinging gate, H, extends outwardly from the rear of the delivery end of the baling-chamber A, and by a crank, 12, and connecting-rod $e^3$ is held in a horizontal position by the eye 11 of the shaft $e'$, and a spring, 19, serves to keep it thus, so that a motion of the gate H will be communicated through the crank 12 and rod $e^3$ to the shaft $e'$. Therefore a finished bale of hay in being ejected from the press will depress the tail-gate H, which will operate the shaft $e'$, and allow the bar B to come into contact with the pawl 8 and operate the inserters $i$, as above described. It will thus be seen that the ejection of one bale is the automatic means for determining the length of each succeeding one, and consequently all the bales produced by the press will be uniform in length, bulk, and weight.

The operation of the traverser C is continuous, and as long as it works the hay will be forced and compressed into the bale-chamber, and the bale will not be completed until the wire-inserters are operated, as the insertion of them determines the length of the succeeding bales. Therefore the first one or two bales may have their length fixed by inserting the wires through the medium of the hand-lever G, which, as before mentioned, operates the crank 10, thereby allowing the bar B to operate the frame D.

Extending along the side of the bar B and secured to it is a rack, $m$, which gives a retrograde motion to a pinion, $n$, loosely mounted upon a horizontal shaft, $o$, so that the forward motion of the bar B and rack $m$ will revolve the pinion $n$ in one direction, and the backward movement of the bar and rack will revolve it in the opposite direction. The upper part of the collar of this pinion $n$ is provided with a clutch which forms a coupling, $p$, with the collar 13, also mounted upon the shaft $o$ so as to turn with it, and at the same time have a free horizontal motion. A groove in the collar 13 allows it to turn freely in the end of a rod, $q$, hinged to the bracket 14. This rod $q$ is provided with a vertical stud, $s$, projecting upwardly, and also a dog, $z$, which latter is operated by the pawl $v$ on the bar B.

The operation of these parts is as follows: Normally the clutch $p$ is separated. Then the stud $s$ projects up above the side of the frame, and the dog $z$ is separated so as to come in contact with the pawl $v$, and while in this position the pinion $n$ revolves freely on the shaft $o$, which at this time is stationary. When, however, the wire-inserters $i$ are operated, then a suitable part, 15, of the frame D comes into contact with the stud $s$. This forces the collar 13 down and closes the clutch $p$. (The wire-inserters $i$ are by this time through the box or bale-chamber, and the wire delivered to the wire twisters and cutters, indicated by the device 16.) Then the continued forward motion of the rack $m$ causes the pinion $n$ through the clutch $p$ and collar 13 to rotate the shaft $o$, which in turn operates the wire-twisters 16 through the medium of the miter-gears $t\,u$ and shaft $w$. When the clutch $p$ is closed the dog $z$ is down in the line of travel of the pawl $v$, so that the rack $m$ in its return movement causes the pawl $v$ to force the dog $z$, rod $q$, stud $s$, and collar 13 upward, thus separating the clutch $p$, whereby the shaft $o$ and the wire-twisting mechanism 16 again become stationary, and remain so until they are again set in motion by the operation of the frame D. The binding-wire $j$ is fed off from the spool or reel 20 on the frame D, and over the pulleys $k$ and and $l$, thence through the eyes in the points of the wire-inserters $i$, and finally is held by the wire tying and twisting mechanism 16. Thus as the hay is forced into the bale-chamber, the end of the wire being held by 16, the continued formation of the bale forces the wire along both sides of the bale and around the finished end of the same, the wire required to do this being obtained from the supply-spool 20, and when the length of the bale is determined the subsequent insertion of the wire completes the circuit of the bale, carrying the wire to the cutters and twisters 16, where it is cut, the ends forming the band twisted, and the end connected to the spool 20, held in place by the cutters and twisters 16, and the operation as above described is successively performed.

I do not claim the wire cutting and twisting devices, as they are shown, described, and claimed in Patent No. 230,100, July 13, 1880.

The traverser C is provided with longitudinal slots 17, whereby it may be carried beyond the wire-inserters when they are in place, and thereby facilitate their operation and prevent the material from interfering with them. It is also provided with a recess, 18, whereby the pitman may be pivoted within it and effective use of it secured in short distances between the traverser and its crank.

Instead of the slots extending along the entire sides of the baling-chamber, I provide simple holes or orifices in the line of travel of the inserters, which greatly strengthens the bale-chamber, and at the same time provides a smooth unbroken interior for said chamber.

Having thus described my invention, what I claim as new and useful, and desire to secure by Letters Patent of the United States, is—

1. The combination, in a baling-press, of a series of wire-inserters arranged to be automatically operated by the traverser, substantially as described.

2. In a baling-press, an independent adjustable tension device whereby the ejection of the finished bale may be retarded, as and for the purpose set forth.

3. In a baling-press, means for operating the wire-inserters through the gravity of the ejected bale, as and for the purpose set forth.

4. In a baling-press, a series of wire-inserters operated by the power applied to the traverser, said operation and insertion being controlled by an independent hand mechanism, as and for the purpose set forth.

5. In a baling-press, a series of wire-inserters operated by the traverser at a right angle to the line of compression, as and for the purpose set forth.

6. A baling-press arranged to continuously and automatically compress, tie, and eject completed bales by the power applied to the traverser, as and for the purpose set forth.

7. In a baling-press, a wire-inserting device arranged to insert the tying-wire so that the subsequent process of completing the bale will cause the wire to encompass three of the sides thereof, and a second operation of the inserters cause the tie-wire to be carried completely around the bale, as set forth.

8. In a baling-press, a wire-inserting device arranged to automatically insert the tie-wire, so that the process of completing the bale will cause the wire to partially encompass said bale, as set forth.

9. In a baling-press arranged to automatically press and tie bales, an intermediate means for operating the tying mechanism by and through the power derived from the traverser, as set forth.

10. In a baling-press arranged to press and tie bales, a wire-inserting device which, when in use, causes the wire-tying mechanism to operate as set forth.

11. In a baling-press provided with a wire tying and twisting mechanism, a series of wire-inserters arranged to be simultaneously operated with the traverser, as set forth.

12. The combination, in a baling-press, of the rollers $a$ $a'$, provided with cranks $d$ $d$ and rod $c$, lever $b$, rack $b'$, and pin $b^2$, as set forth.

13. The combination, in a baling-press, of the crank 4, connecting-rod 3, and traverser C, provided with horizontal recesses, as set forth.

14. The combination, in a hay-press, of the traverser, its connecting-rod, and means for operating the same, with the rod B, arm $e$, and the frame D, arranged to operate the wire-inserters $i$, as set forth.

15. In a hay-press, the combination, with the traverser and means for operating the same, of the rod B, arm $e$, frame D, and wire-inserters $i$, and the hand-lever G, rod $e^2$, and shaft $e'$, as set forth.

16. The combination, in a hay-press provided with wire cutting and twisting mechanism, of the gate H, crank 12, rod $e^3$, spring 19, shaft $e'$, frame D, rod B, and traverser C, as set forth.

17. The combination, in a hay-press, of the traverser and means for operating the same, of the rack $m$, pinion $n$, clutch $p$, rod $q$, stud $s$, dog $z$, and pawl $v$, and the frame D, provided with the shaft $e$ and spring $f$, as set forth.

18. The combination, in a baling-press, of a series of wire-inserters arranged to be automatically operated by the forward motion of the traverser, as set forth.

19. In a baling-press, the combination of the means whereby the ejection of the finished bale automatically operates the wire-inserting devices, as set forth.

20. In a baling-press, the wire-inserters automatically operated in and by the forward motion of the traverser, in combination with a baling-chamber provided with orifices arranged to receive the wire-inserters, as set forth.

21. In a baling-press, a bale-chamber provided with orifices for the reception of the wire-inserters, in combination with the devices for automatically operating the same, as set forth.

22. In a baling-press, the traverser C, having the recess 18 for the reception of the end of the pitman 3, as set forth.

23. In a baling-press, the combination of the crank 4, connecting-rod 3, and traverser C, having slots 17 and recess 18, as set forth.

24. In a baling-press, a bale-chamber provided with circular orifices for the insertion of the wire for tying the bale, as set forth.

25. In a baling-press, a bale-chamber having rigid parallel sides, in combination with a tension device whereby the ejection of the finished bale may be controlled, as set forth.

26. In a baling-press, a slotless bale-chamber having orifices for the insertion of the tying-wires, as set forth.

In testimony whereof I affix my signature in presence of two witnesses.

PARVIN WRIGHT.

Witnesses:
S. P. GUTSHALL,
G. H. CONNER.